United States Patent
Xiong et al.

(10) Patent No.: US 11,481,871 B2
(45) Date of Patent: Oct. 25, 2022

(54) IMAGE-GUIDED DEPTH PROPAGATION FOR SPACE-WARPING IMAGES

(71) Applicant: SAMSUNG ELECTRONICS CO., LTD., Gyeonggi-Do (KR)

(72) Inventors: Yingen Xiong, Mountain View, CA (US); Christopher A. Peri, Mountain View, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/402,005

(22) Filed: Aug. 13, 2021

(65) Prior Publication Data

US 2022/0292631 A1    Sep. 15, 2022

Related U.S. Application Data (60) Provisional application No. 63/160,699, filed on Mar. 12, 2021.

(51) Int. Cl.
*G06T 3/00* (2006.01)
*G06T 7/50* (2017.01)
(Continued)

(52) U.S. Cl.
CPC ............ *G06T 3/0093* (2013.01); *G06F 3/012* (2013.01); *G06T 7/13* (2017.01); *G06T 7/50* (2017.01); *G06T 2207/10024* (2013.01)

(58) Field of Classification Search
CPC ........... G06T 3/0093; G06T 7/13; G06T 7/50; G06T 2207/10024; G06F 3/012
See application file for complete search history.

(56) References Cited

U.S. PATENT DOCUMENTS 10,482,669 B2    11/2019  Rober et al.
10,504,272 B2    12/2019  Lawless et al.
(Continued)

FOREIGN PATENT DOCUMENTS

CN    108062769 A  *  5/2018  .............. G06T 7/50
CN    109583457 A  *  4/2019  ........... G06K 9/4604
(Continued)

OTHER PUBLICATIONS

Cheng, X., Wang, P., & Yang, R. (2019). Learning depth with convolutional spatial propagation network. IEEE transactions on pattern analysis and machine intelligence, 42(10), 2361-2379.*
(Continued)

*Primary Examiner* — Sarah Lhymn
(74) *Attorney, Agent, or Firm* — Cuenot, Forsythe & Kim, LLC (57) ABSTRACT

Updating an image during real-time rendering of images by a display device can include determining a depth for each pixel of a color frame received from a source device and corresponding to the image. Each pixel's depth is determined by image-guided propagation of depths of sparse points extracted from a depth map generated at the source device. With respect to pixels corresponding to an extracted sparse depth point, image-guided depth propagation can include retaining the depth of the corresponding sparse depth point unchanged from the source depth map. With respect to each pixel corresponding to a non-sparse depth point, image-guided depth propagation can include propagating to the corresponding non-sparse depth point a depth of a sparse depth point lying within a neighborhood of the non-sparse depth point. Pixel coordinates of the color frame can be transformed for generating a space-warped rendering of the image.

20 Claims, 8 Drawing Sheets

(51) Int. Cl.
　　　*G06T 7/13*　　　(2017.01)
　　　*G06F 3/01*　　　(2006.01)

(56) References Cited

U.S. PATENT DOCUMENTS

| | | | |
|---|---|---|---|
| 10,607,313 | B2 | 3/2020 | Jenny |
| 10,672,197 | B2 | 6/2020 | Bates |
| 10,776,992 | B2 | 9/2020 | Melkote Krishnaprasad et al. |
| 10,803,826 | B2 | 10/2020 | Fruchter et al. |
| 10,852,838 | B2 | 12/2020 | Abovitz et al. |
| 10,965,929 | B1 | 3/2021 | Bellows et al. |
| 2003/0091225 | A1 | 5/2003 | Chen |
| 2015/0016777 | A1 | 1/2015 | Abovitz et al. |
| 2017/0345220 | A1 | 11/2017 | Bates |
| 2018/0302612 | A1 | 10/2018 | Kopf et al. |
| 2019/0037244 | A1 | 1/2019 | Melkote Krishnaprasad et al. |
| 2019/0228504 | A1 | 7/2019 | Tong et al. |
| 2020/0104975 | A1 | 4/2020 | Banerjee et al. |
| 2020/0273190 | A1* | 8/2020 | Ye .................. G06T 7/579 |
| 2020/0273192 | A1 | 8/2020 | Cheng et al. |
| 2021/0004979 | A1 | 1/2021 | Valentin et al. |
| 2021/0174524 | A1* | 6/2021 | Wang ................. G06N 3/084 |
| 2021/0279904 | A1* | 9/2021 | Sinha ................. G06T 9/002 |

FOREIGN PATENT DOCUMENTS

| | | |
|---|---|---|
| EP | 3349176 A1 | 7/2017 |
| WO | 2015161307 A1 | 10/2015 |
| WO | 2015192117 | 12/2015 |
| WO | 2020000390 A1 | 1/2020 |

OTHER PUBLICATIONS

Zhang, Y., Nguyen, T., Miller, I. D., Shivakumar, S. S., Chen, S., Taylor, C. J., & Kumar, V. (2019). Dfinenet: Ego-motion estimation and depth refinement from sparse, noisy depth input with rgb guidance. arXiv preprint arXiv: 1903.06397.*

Yan L, Liu K, Belyaev E. Revisiting sparsity invariant convolution: A network for image guided depth completion. IEEE Access. Jul. 10, 2020;8:126323-32.*

Eldesokey, A., Felsberg, M., & Khan, F. S. (2019). Confidence propagation through cnns for guided sparse depth regression. IEEE transactions on pattern analysis and machine intelligence, 42(10), 2423-2436.*

Peri, C. and Xiong, Y., Jan. 2021. Image Guided Depth Super-Resolution for Spacewarp in XR Applications. In 2021 IEEE International Conference on Consumer Electronics (ICCE) (Abstract). IEEE.

"Two New Samsung Glasses Just Leaked," [online] Video Transcript, retrieved from the Internet: <https://www.youtube.com/watch?v=qRKNc-YwpnY&ab_channel=TyrielWood-VRTech>, 10 pg.

Blumberg, M., "Samsung reveals an experimental AR headset that isn't a Samsung product," [online] Nov. 7, 2018, Silicon Valley Global News, <https://medium.com/silicon-valley-global-news/samsung-reveals-an-experimental-ar-headset-that-isnt-a-samsung-product-d7b75ec8f52e>, 5 pg.

WIPO Appln. PCT/KR2022/003348, International Search and Written Opinion, dated Jun. 22, 2022, 9 pg.

* cited by examiner

Determine a depth for each pixel of a color frame received from a source device and corresponding to the image, wherein each depth is determined based on an image-guided propagation of depths of sparse depth points extracted from a source depth map
502

↓

For each pixel of the color frame corresponding to a sparse depth point, retain a depth of the corresponding sparse depth point unchanged from the source depth map
504

↓

For each pixel of the color frame corresponding to a non-sparse depth point, propagate to the corresponding non-sparse depth point a depth of a sparse depth point lying within a neighborhood of the non-sparse depth point
506

↓

Transform pixel coordinates of the color frame using depths generated by the image-guided depth propagation and a predicted head pose of a user of the display device for displaying with the display device a space-warped rendering of the image
508

IMAGE-GUIDED DEPTH PROPAGATION FOR SPACE-WARPING IMAGES

CROSS-REFERENCE TO RELATED APPLICATIONS

This application claims the benefit of U.S. Provisional Patent Application No. 63/160,699 filed on Mar. 12, 2021, which is incorporated herein by reference in its entirety.

TECHNICAL FIELD

This disclosure relates to image processing, and more particularly, to processing images rendered in an extended reality (XR) environment.

BACKGROUND

An XR environment can be one providing a user a virtual reality (VR), an augmented reality (AR), or a mixed reality (MR) experience. In an XR environment a display device may communicate via a wireless or wired connection with a source device. The display device may be a head-mounted display (HMD), a pair of AR glasses, or similar such device capable of rendering images by processing image information received from the source device. Given the advent of 5G, WiGig (IEEE802.11ay) and other high-speed, low-latency wireless protocols, it is anticipated that increasingly the next-generation of XR devices will communicate with a host utilizing a wireless connection. Notwithstanding the potential for near real-time communication with 60 GHz wireless protocols, however, latency is likely to remain an issue, especially as image sizes and resolution requirements continue to increase.

SUMMARY

In an example implementation, a computer-based method for updating an image during a real-time rendering of images can include determining with a display device a depth for each pixel of a color frame received from a source device and corresponding to the image. Each depth can be determined by performing an image-guided propagation of depths of sparse depth points extracted from a source depth map generated at the source device. The image-guided propagation of depths can include, with respect to each pixel of the color frame corresponding to a sparse depth point, retaining the depth of the corresponding sparse depth point unchanged from the source depth map. The image-guided propagation of depths can include, with respect to each pixel of the color frame corresponding to a non-sparse depth point, propagating to the corresponding non-sparse depth point the depth of a sparse depth point lying within a neighborhood of the non-sparse depth point. The method can include transforming pixel coordinates of the color frame using the depths generated by the image-guided depth propagation and a predicted head pose of a user of the display device to display with the display device a space-warped rendering of the image.

In another example implementation, a system for updating an image during a real-time rendering of images by a display device includes a processor configured to initiate operations. The operations can include determining a depth for each pixel of a color frame received from a source device and corresponding to the image. Each depth can be determined by performing an image-guided propagation of depths of sparse depth points extracted from a source depth map generated at the source device. The image-guided propagation of depths can include, with respect to each pixel of the color frame corresponding to a sparse depth point, retaining a depth of the corresponding sparse depth point unchanged from the source depth map. The image-guided propagation of depths can include, with respect to each pixel of the color frame corresponding to a non-sparse depth point, propagating to the corresponding non-sparse depth point a depth of a sparse depth point lying within a neighborhood of the non-sparse depth point. The operations can include transforming pixel coordinates of the color frame using the depths generated by the image-guided depth propagation and a predicted head pose of a user of the display device to display with the display device a space-warped rendering of the image.

In another example implementation, a computer program product includes one or more computer readable storage media, and program instructions collectively stored on the one or more computer readable storage media. The program instructions are executable by computer hardware to initiate operations. The operations can include determining with a display device a depth for each pixel of a color frame received from a source device and corresponding to the image. Each depth can be determined by performing an image-guided propagation of depths of sparse depth points extracted from a source depth map generated at the source device. The image-guided propagation of depths can include, with respect to each pixel of the color frame corresponding to a sparse depth point, retaining a depth of the corresponding sparse depth point unchanged from the source depth map. The image-guided propagation of depths can include, with respect to each remaining pixel of the color frame corresponding to a non-sparse depth point, propagating to the corresponding non-sparse depth point a depth of a sparse depth point lying within a neighborhood of the non-sparse depth point. The operations can include transforming pixel coordinates of the color frame using depths generated by the image-guided depth propagation and a predicted head pose of a user of the display device to display with the display device a space-warped rendering of the image.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to image processing, and more particularly, to processing images rendered in an XR environment (a VR, an AR, or an MR environment). The rendering of images on an XR device (e.g., HMD, AR glasses) using image information received from an image-rendering source device (e.g., computer, console, cloud-based server) is typically subject to a delay between the time the XR device sends to the source device a user's current head pose and receives from the source device the image information. Although brief (e.g., milliseconds), the delay causes the image rendered by the XR device based on the received image information to be misaligned with the user's head pose, which may have changed in the interim. Space-warping—that is, generating a depth-based reprojection of an image based on depth and predicted head pose information—can compensate for the delay. To perform the space-warping, however, the XR device requires both color information (provided by a color frame corresponding to the image) and depth information (provided by a depth map). Thus, while mitigating image misalignment, space-warping exacerbates the problem of data transmission load by necessitating conveyance of both color and depth information from the source device to the XR device.

In accordance with the inventive arrangements disclosed herein, example methods, systems, and computer program products are provided that enable a display device, such as an HMD, AR glasses, or other XR device, to perform space-warping using only sparse depth points and predicted head pose. The sparse depth points are extracted from a source depth map generated by a source device communicatively coupled with the depth map. The sparse depth points are fewer in number than the full complement of depth points of the source depth map. Using only sparse depth points, the display device is capable of space-warping an image without the source device conveying the entire source depth map.

The inventive arrangements described within this disclosure include an image-guided depth propagation methodology. Image-guided depth propagation is capable of providing depths needed for space-warping an image without the necessity of a source device-generated depth map. In lieu of the source depth map, depths are determined using a reduced subset comprising only the sparse depth points extracted from the source depth map. Image-guided propagation, in certain arrangements, can efficiently reconstruct a depth map using sparse depth points in conjunction with edge and boundary information from a color frame generated by the source device as a guide. The reconstructed depth map can provide a more accurate representation of the source depth map than does a map generated using conventional down-sampling. The depths determined from the process of image-guided depth propagation enable the display device to render a high-quality, space-warped image.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 1:
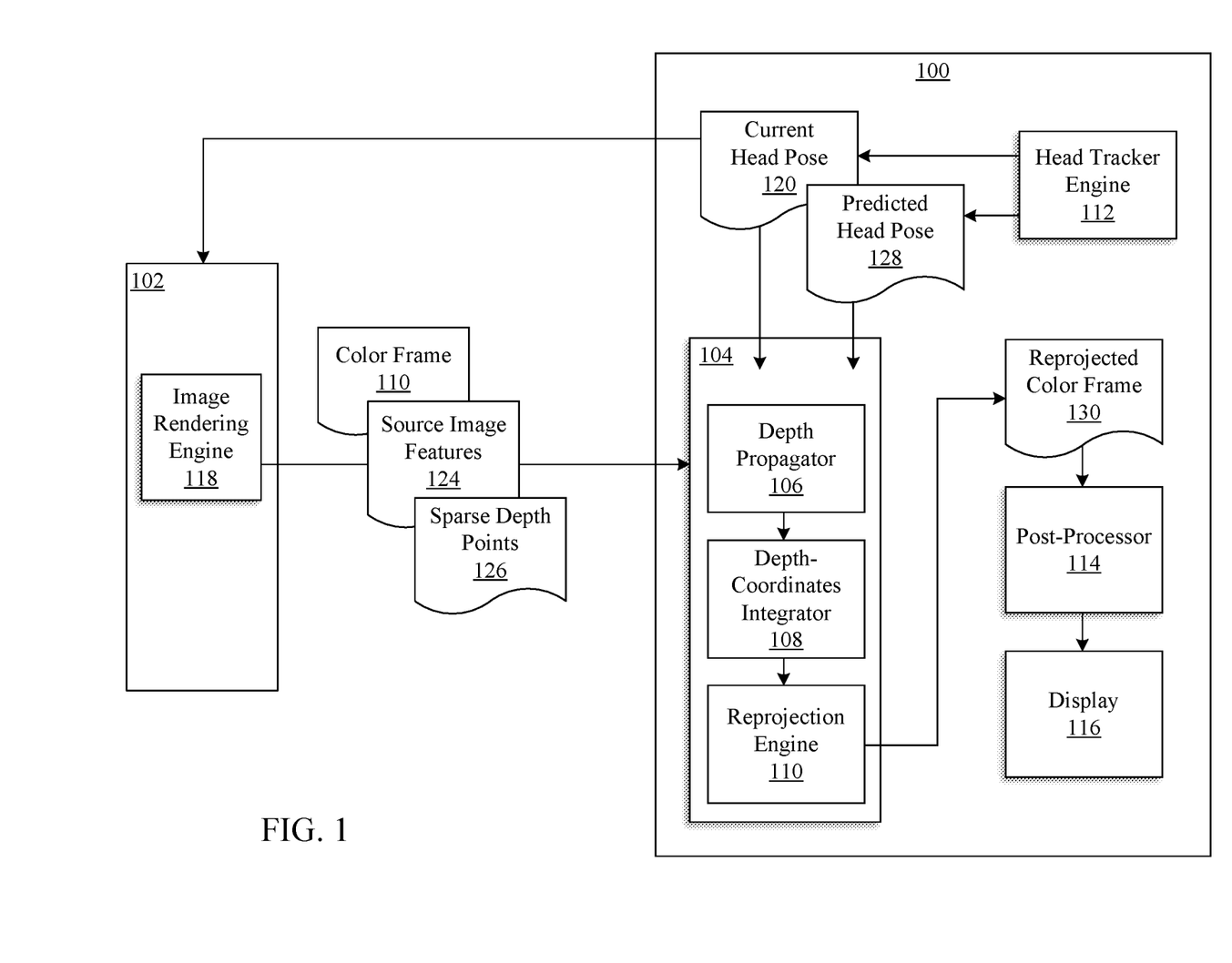
FIG. 1 illustrates an example system for space-warping an image using image-guided depth propagation.
Figure 6:
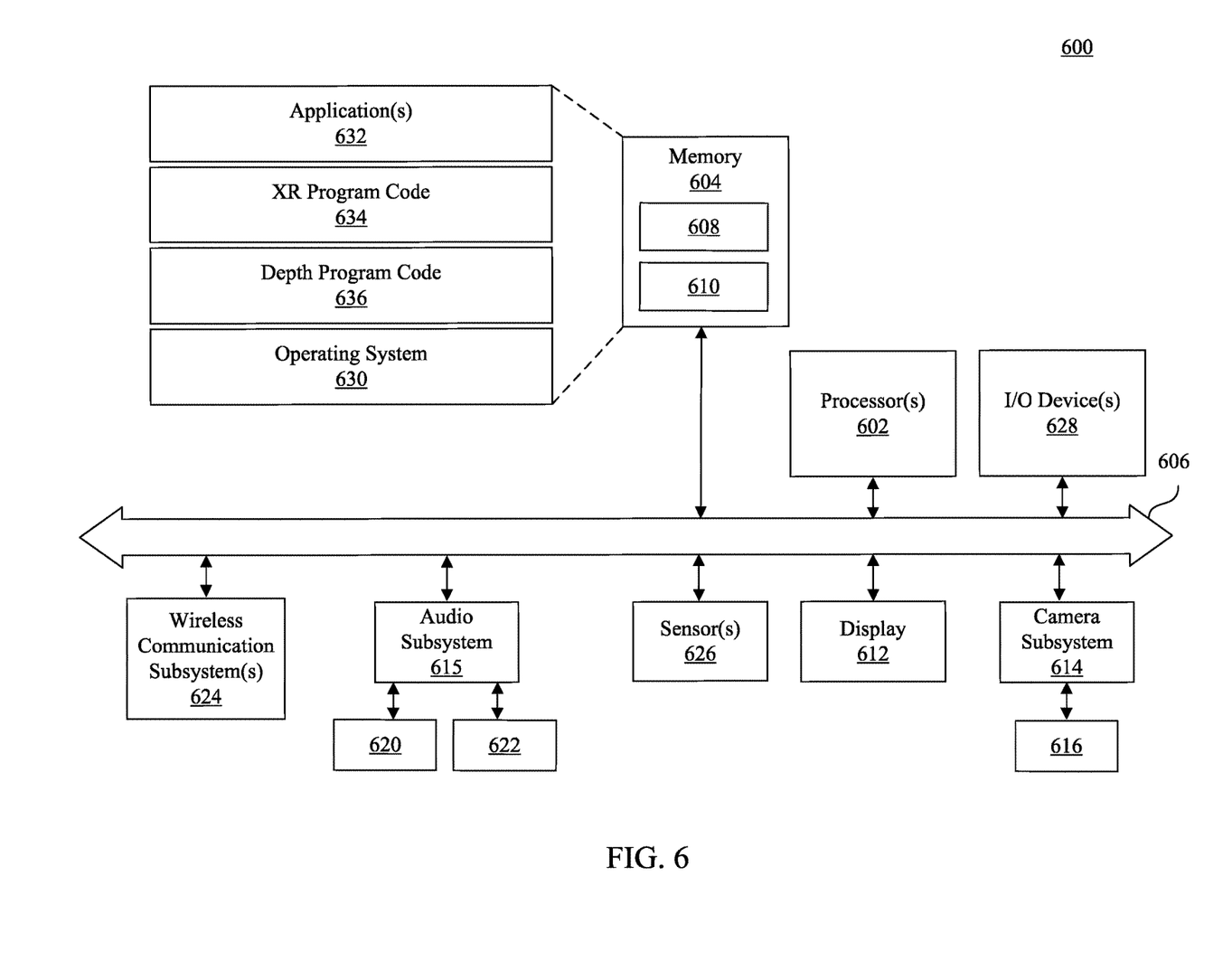
FIG. 6 illustrates example devices for space-warping images using image-guided depth propagation based on sparse depth points.

FIG. 1 includes display device 100. Display device 100 is an HMD, a pair of AR glasses, or other such device configured to display XR images using color and depth information received from source device 102, which communicatively couples via a wireless or wired connection with display device 100. As an HMD, a pair of AR glasses, or similar device, display device 100 can include at least some of the components described with reference to device 600 (FIG. 6). Source device 102 can be a portable device (e.g., smartphone), computing device (e.g., computer, laptop, XR console) or other device that likewise can include components described with reference to device 600 (FIG. 6).

Display device 100 implements example system 104 for space-warping images using image-guided depth propagation. System 104 can be implemented in hardware (e.g., as dedicated circuitry), software (e.g., program code executed by one or more processors), or a combination thereof. Illustratively, system 104 includes depth propagator 106, depth-coordinates integrator 108, and reprojection engine 110. Operatively coupled with system 104 is head tracker 112 and post-processor 114, both of which are also implemented in display device 100. Display device 100 also includes display 116 that displays images (e.g., XR images), including images rendered using image information conveyed to display device 100 from source device 102.

Source device 102 includes image rendering engine 118, which renders images (e.g., video) that are conveyed to display device 100. The viewpoint of images rendered for viewing on display 116 can be that of a user of display device 100. The user's viewpoint is determined according to current head pose 120 determined by head tracker 112 and conveyed (via wireless or wired connection) to image rendering engine 118. There can be, and typically is, a delay between display device 100's transmitting current head pose 120 to source device 102 and receiving from source device 102 image information for rendering the image on display 116. If the user's viewpoint changes even slightly in the interim, the user sees on display 116 an image from the earlier viewpoint rather than the changed viewpoint. To overcome misalignment of the image owing to the now-changed user viewpoint, the image is space-warped using image-guided depth propagation performed by depth propagator 106.

Depth propagator 106 is capable of performing image-guided depth propagation using color frame 122, source depth map features 124 (e.g., edges, object contours, contours of color images), and sparse depth points 126, which are generated by image rendering image 118 and conveyed to system 104 by source device 102. Using information extracted from color frame 122, source image features 124 (e.g., edges, object contours, image contours), and sparse depth points 126, depth propagator 106 is capable of generating a depth for each pixel of color frame 122 corresponding to the image and received from source device 102. Edges, object contours, image contours of source image features 126 can be used as a guide to the image guided propagation depths within neighborhoods of depth points, as described below Sparse depth points 126 are selected depth points extracted from a source depth map generated by image rendering engine 118. The number of sparse depth points 126 is less than the total number of depth points of the source depth map. The number of sparse depth points 126 can vary (e.g., between 3 and 25 percent of total number of depth points of the source depth map). For each pixel of the color frame corresponding to a sparse depth point, depth propagator 106 can retain the depth of the corresponding sparse depth point unchanged from the source depth map. For each remaining pixel of the color frame corresponding to a non-sparse depth point, depth propagator 106 propagates a depth. The depth propagated to the corresponding non-sparse depth point is the depth of a sparse depth point lying within a neighborhood of the non-sparse depth point. As described below, in certain embodiments, depth propagator 106 determines the depths propagated to corresponding pixels by optimizing a predetermined function. The optimization, in certain embodiments, entails minimizing a predetermined criterion function. The criterion function can include a summation of distances (e.g., Euclidean distances) between pairs of depth points lying within a system-determined neighborhood.

Depth-coordinates integrator 108 integrates the depths determined from image-guided propagation with the coordinates of each corresponding pixel. The depth of each pixel is the depth of a corresponding depth point, either a retained depth of a sparse depth point or the propagated depth of a non-sparse depth point. The pixel coordinates and corresponding depth are integrated by depth-coordinates integrator 108 with current head pose 120 and predicted head pose 128 determined by head tracker engine 112. The integrated pixel coordinates, depths, current head pose 120 and predicted head pose 128 are input to reprojection engine 110, which generates reprojected color frame 130 based on the integration. Reprojected color frame 130 can be an RGB-D (Red, Green, Blue, Density pixel) map. Reprojection engine 110 can generate a 2D-to-3D reprojection, which provides a newly revised color frame, reprojected color frame 130, corresponding to predicted head pose 128. Reprojected color frame 130 is input to post-processor 114, which projects and warps reprojected color frame 130 from 3D to 2D space and corrects distortions. Reprojected color frame 130, generated from transforming pixel coordinates of color frame 122 using depths generated by the image-guided depth propagation, is conveyed to display 116 for displaying a space-warped rendering of the image. The space-warped rendering corresponds to predicted head pose 128 of the user.

Figure 2:
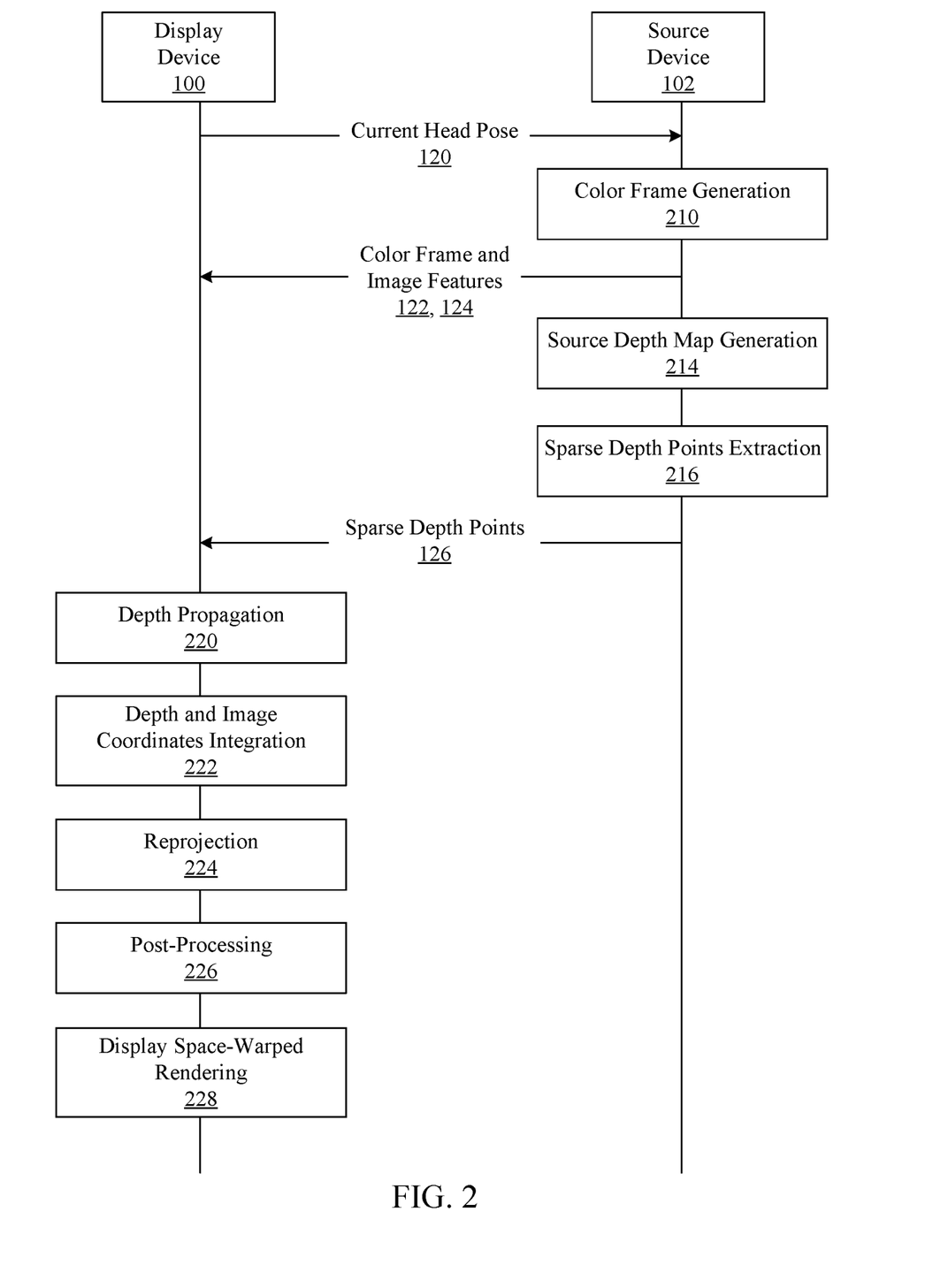
FIG. 2 illustrates an example information exchange between a display device and a source device communicatively coupled to the display device, which uses image-guided depth propagation for space-warping an image received from the source device.

FIG. 2 illustrates in summary fashion example image information exchange 200 between display device 100 (e.g., HMD, AR glasses) and source device 102 (e.g., computer, console, smartphone) for transforming an image (e.g., video frame) in real-time for presenting on display device 100 a space-warped rendering of the image. Head tracker 112 performs head tracking 206 of a user viewing images displayed on display 116. Current head pose 120 corresponding to the user's current viewpoint is conveyed to source device 102, which renders images for displaying on display device 100. Source device 102 performs color frame generation 210 and conveys color frame 122 and image features 124 of an image to display device 100. Additionally, source device 102 performs source depth map generation 214 and sparse depth points extraction 216. Source device 102 conveys sparce depth points 126 to display device 202. Based on the data received from source device 102 as well as predicted head pose of the user 128, depth propagator 106 performs depth propagation 220. Depth-coordinates integrator 108 performs depth and image coordinates integration 222. Reprojection engine 110 performs reprojection 224, and post-processor 114 performs post-processing 226 of a reprojected color frame for transforming an image for displaying space-warped rendering 228 of the image on 116.

Figure 3A:
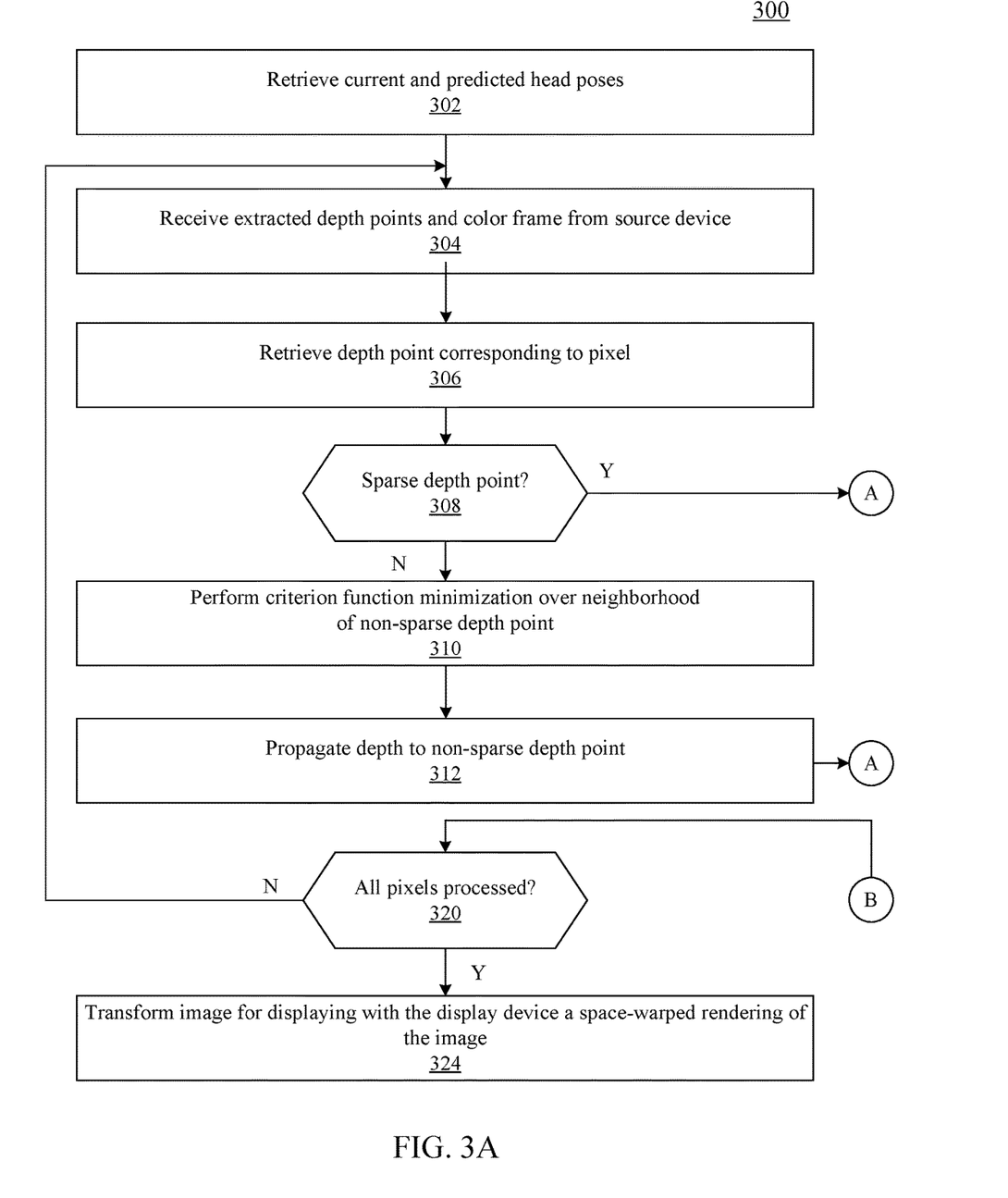
FIGS. 3A and 3B illustrate an example method of space-warping an image using image-guided depth propagation.
Figure 3B:
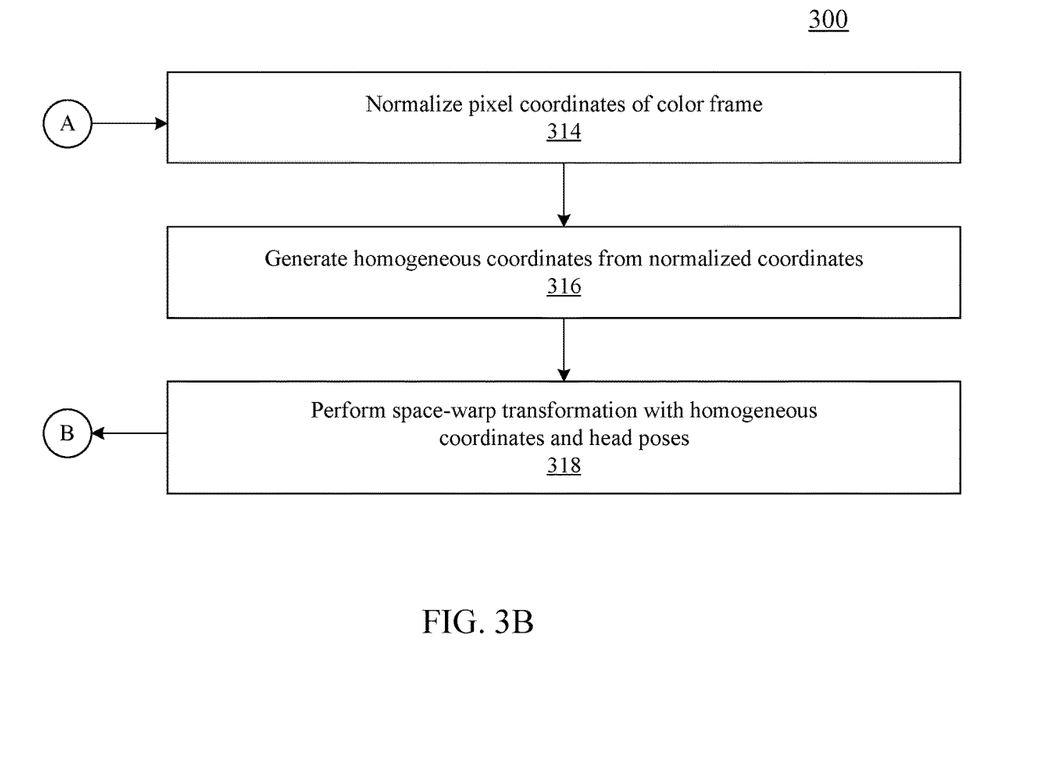

FIGS. 3A and 3B illustrate an example method 300 of transforming an image for displaying a space-warped rendering of the image, according to certain embodiments. Method 300 can be performed by display device 100 (e.g., HMD, AR glasses) that implements an image-guided depth propagation system for space-warping images. The device and image-guided depth propagation system for space-warping images are referred to, collectively, as "the system."

At block 302, the system retrieves the current and a predicted head pose of a user. The current and predicted head poses can be generated by a head tracker of the system's display device. The current and predicted head poses correspond to a user's viewpoint—current and predicted, respectively—for viewing images rendered by the system's display device.

At block 304, the system receives sparse depth points and a color frame corresponding to an image generated at a source device communicatively coupled via a wireless or wired connection with the system. The sparse depth points are selected depth points extracted from a source depth map generated by an image rendering engine of the source device.

The sparse depth points extracted from the source depth map are fewer than the full array of depth points comprising the source depth map. Each sparse depth point corresponds to a pixel of the color frame. For each pixel of the color frame for which there is no corresponding sparse depth point, the system supplies a non-sparse depth point and propagates to the non-sparse depth point the depth of a system-selected sparse depth point. The system propagates depths within system-determined neighborhoods according to image-guided depth propagation.

In a pixel-by-pixel image-guided depth propagation, the system at block 306 retrieves a depth point corresponding to a pixel of the color frame.

At decision block 308, the system determines whether the depth point is a sparse depth point or non-sparse depth point. If the system determines at decision block 308 that the depth point is a sparse depth point, the procedure branches to block 314 and processing continues with the depth of the sparse depth point combined with the predicted head pose retrieved at block 302. If at decision block 306, the system determines the depth point is a non-sparse depth point, then the depth of a system-selected (block 310) sparse depth point is propagated to the non-sparse depth point.

At block 310, the system is capable of determining a depth for propagation to the non-sparse depth point. The system determines a depth $d(p)$, where p is the pixel whose coordinates correspond to the non-sparse depth point. In certain arrangements, the system determines depth $d(p)$ by performing an optimization with respect to a predetermined function. For example, the system can determine depth $d(p)$ by selecting the depth that minimizes a criterion function;

that is, $d(p)=\mathrm{argmin}_d(J(d))$, where $J(d)$ is a predetermined criterion function. In some embodiments, criterion function $J(d)$ is $$J(d)\mu_s W_s \sum_p \|d(p)-d_s(p)\|_2^2 + \mu_m \sum_{(p,q)\in S} W_{pq} \|d(p)-d(q)\|_2^2$$

where the first summation $\Sigma_p \|d(P)-d_s(p)\|_2^2$ is a summation of Euclidean distances taken over neighborhood M of pixel p and ensures that the depth of each sparse depth point remains unchanged from that the depth the depth point had as part of the source depth map from which the depth point is extracted. The neighborhood M can be determined from the density of the sparse depth points around pixel p. The greater the density (number of sparse points in the neighborhood), the smaller can be the area (e.g., a 3×3 array). Conversely, the fewer the sparse points, the larger the area (e.g., a 5×5 array). Thus, the domain of the criterion function coincides with the respective neighborhoods of the pixels corresponding to sparse and non-sparse depth points The second summation $\Sigma_{(p,q)\in N} W_{pq} \|d(p)-d(q)\|_2^2$ is also a summation of Euclidean distances, albeit taken over pixels within the neighborhood $(p,q)\in N$ comprising currently considered non-sparse depth points of neighborhood N of pixel p. The coefficients and $\mu_m$ balance the respective summations. Generally, $\mu_s=1$ and $\mu_m=1$, but the values can vary according to different requirements of a specific application. Weight $W_s$ is a binary parameter $$W_s = \begin{cases} 1 & \text{at sparse points} \\ 0 & \text{otherwise} \end{cases}$$

applied to the first summation, and weight $W_{pq}$ (determined based on information also acquired from the color frame received from the source device) is applied to the second summation.

Weight $W_{pq}$ can serve as a guide with respect to the smoothing performed by the second summation $\Sigma_{(p,q)\in N} W_{pq} \|d(p)-d(q)\|_2^2$ whereby inter-depth point regions within each neighborhood $(p,q)\in N$ are smoothed. To avoid image blurring, however, depths at image edges, image contours, and object contours (source depth map features), are not smoothed. Rather, at the edges, contours, and the like (source depth map features), the image-guided depth propagation allows discontinuities. Weight $W_{pq}$ is zero at depth points corresponding to image edges, image contours, and object contours to allow the discontinuities. As noted above, image-guided propagation can utilize image edges, image contours, and object contours (source depth map features) as guide. Weight $W_{pq}$ is an instrument for utilizing image edges, image contours, and object contours (source depth map features) as guide for image-guided propagation of depths.

At block 312, depth d determined at block 310 is propagated to the non-sparse depth point corresponding to pixel p. In the pixel-by-pixel image-guided depth propagation of method 300, a space-warping transformation of the coordinates of a pixel (blocks 314 to 318) proceeds from the depth determination of the depth point corresponding to the pixel. For a sparse depth point which retains the depth from the source depth map, processing moves from block 308 to 314. For a non-sparse depth point, the space-warping transformation of the coordinates of the pixel corresponding to the non-sparse depth point follows propagation of a depth to the non-sparse depth point according to image-guided depth propagation performed at blocks 310 and 312. The depth d determined at block 310 and propagated at block 312 is used in the processing of pixel p of the color frame beginning at block 314.

At block 314, the system normalizes the coordinates $(x_r, y_r)$ of pixel p by combining the current and predicted head poses retrieved at block 302 with the depth $d(p)$ (whether depth retained by a sparse depth point or propagated to a non-sparse depth point) associated with pixel p. Using the depth and color frame information corresponding to pixel p, the system can normalize the coordinates $(x_r, y_r)$ of pixel p of the color frame according to the size of the color frame (width×height) and add depth d to generate a normalized 3-element vector of coordinates $(x_n, y_n, z_n)$:

$$\begin{pmatrix} x_n \\ y_n \\ z_n \end{pmatrix} = \begin{pmatrix} 2\frac{x_r}{\text{width}} - 1 \\ 2\frac{y_r}{\text{height}} - 1 \\ d \end{pmatrix}.$$

At block 316, the system generates homogenous coordinates of pixel p. The system can generate a vector whose elements are the homogeneous coordinates $(x_h, y_h, z_h, w)$ obtained from normalized coordinates $(x_n, y_n, z_n, 1)$:

$$\begin{pmatrix} x_h \\ y_h \\ z_h \\ w \end{pmatrix} = \begin{pmatrix} x_n \\ y_n \\ z_n \\ 1 \end{pmatrix}.$$

At block 318, the system performs a space-warp transformation of the homogeneous coordinates $(x_h, y_h, z_h, w)$ based on the head poses. The system can reproject pixel p from 2D to 3D space for space-warping the corresponding image. Using projection matrix P, current head pose matrix $S_r$, and predicted head pose matrix $S_i$, the system can generate reprojected coordinates $(x_f, y_f, z_f, w_f)$ for space-warping the image:

$$\begin{pmatrix} x_f \\ y_f \\ z_f \\ w_f \end{pmatrix} = PS_i S_r^{-1} P^{-1} \begin{pmatrix} x_h \\ y_h \\ z_h \\ w \end{pmatrix}.$$

At decision block 320, the system determines whether each pixel of the color frame has been processed according to above-described procedure for generating reprojected coordinates of a space-warped image. If not, the system retrieves another unprocessed pixel. The procedure returns to block 306 and the system retrieves a depth point whose coordinates correspond to the unprocessed pixel. If at decision block 308 the depth point retrieved corresponds to a sparse depth point, then the sparse depth point's retained depth, retained from the source depth map, is applied to the pixel, and processing proceeds directly to block 314. Otherwise, if the pixel corresponds to a non-sparse depth point, processing proceeds to block 310 and the procedures for image-guided depth propagation (block 310 and block 312) are invoked before the procedure branches to block 314.

It at decision block 320 the system determines that all pixels have been processed, then the image is transformed for displaying a space-warped rendering of the image 324. The space-warped rendering comprises pixels whose coordinates are reprojected coordinates ($x_f$, $y_f$, $z_f$, $w_f$) that correspond to the user's predicted head pose.

Figure 4A:
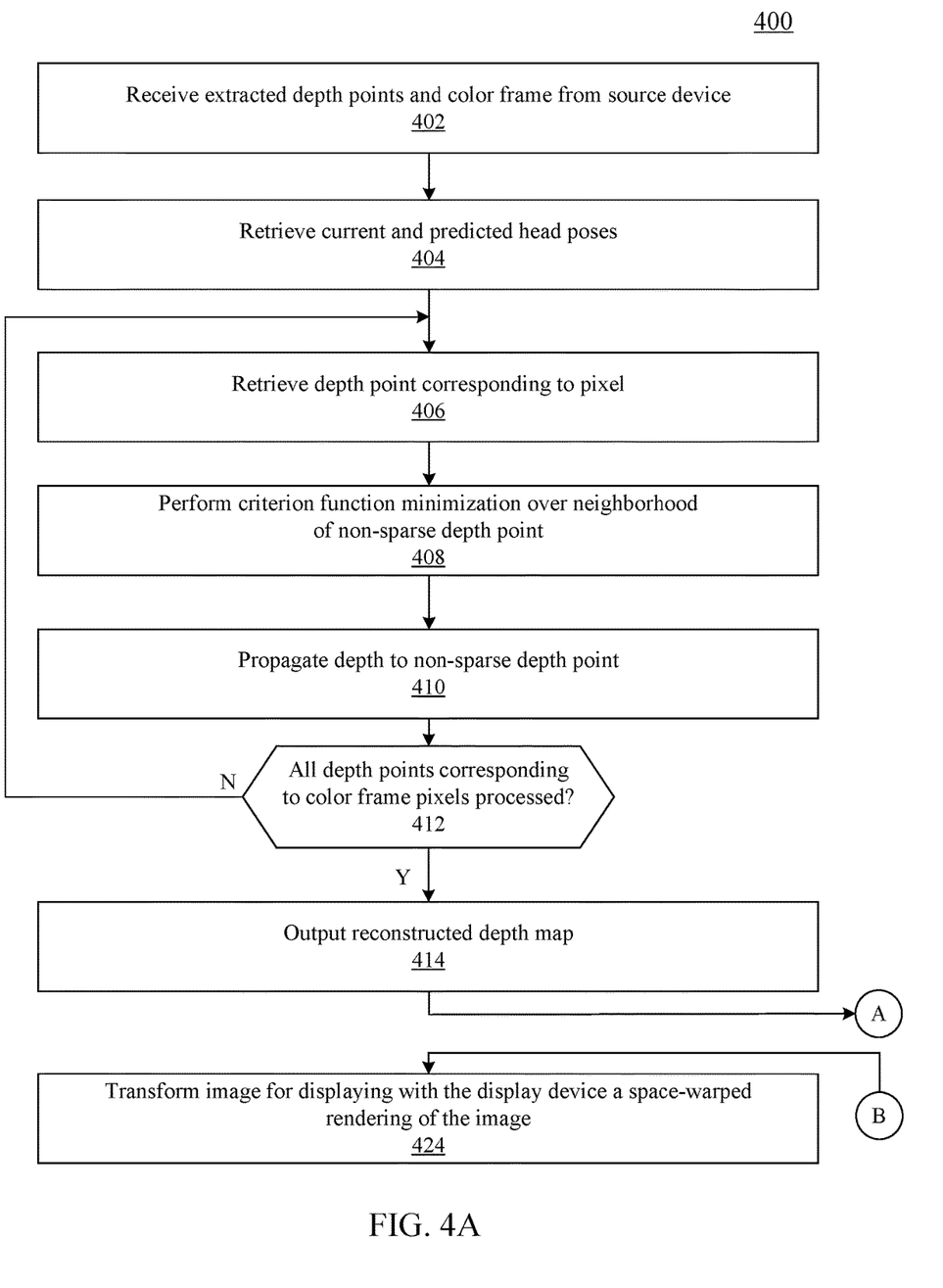
FIGS. 4A and 4B illustrate an example method of space-warping an image using image-guided depth propagation.
Figure 4B:
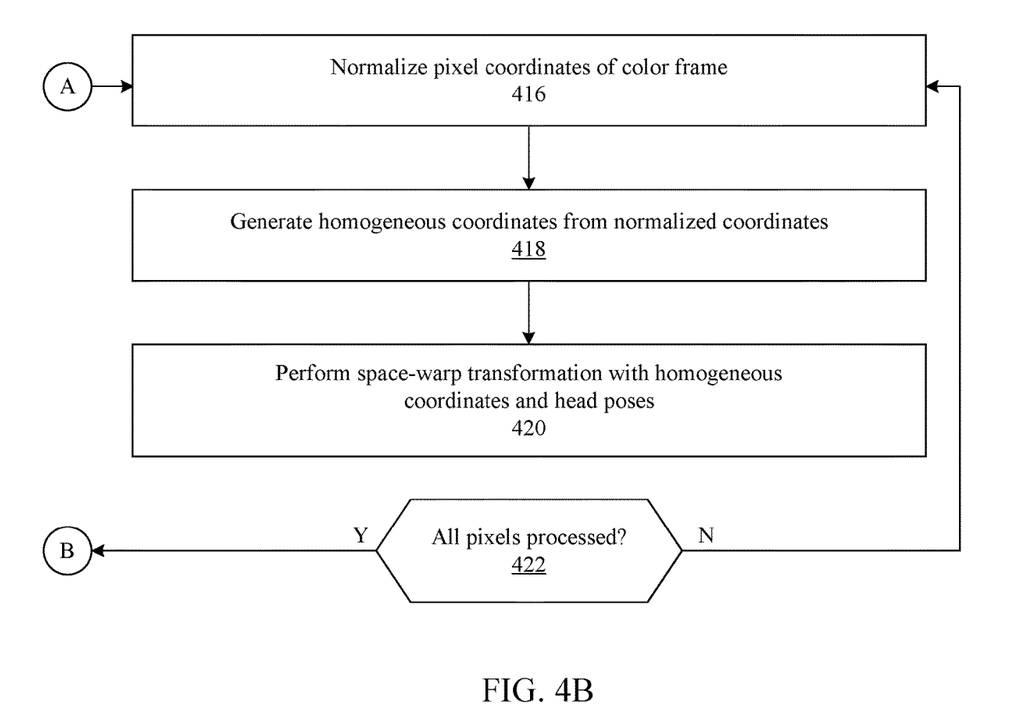

FIGS. 4A and 4B illustrate example method 400 of transforming an image for displaying a space-warped rendering of the image, according to certain embodiments. Method 400 can be performed by display device 100 (e.g., HMD, AR glasses) that implements an image-guided depth propagation system for space-warping images. The device and image-guided depth propagation system for space-warping images are referred to, collectively, as "the system." In implementing method 400, the system reconstructs a depth map using image-guided depth propagation. The system uses a reconstructed depth map to determine depths corresponding to pixels of a color frame and performs a reprojection that transforms the color frame for rendering a space-warped image, the space-warped image corresponding to a predicted head pose of a user.

At block 402, the system retrieves the user's current head pose and a predicted head pose generated by a head tracker of the system's display device. At block 404, the system receives sparse depth points and a color frame corresponding to an image generated at a source device communicatively coupled via a wireless or wired connection with the system. The sparse depth points are selected depth points extracted from a source depth map generated by an image rendering engine of the source device.

Sparse depth points retain the depth each acquired as a depth point of the source depth map from which each was extracted. The reconstructed depth map also includes non-sparse depth points that, though not extracted from the source depth map, correspond to pixels of the color frame received from the source device. Thus, the sparse and non-sparse depth points of the reconstructed depth map both correspond to the pixels of the color frame received at block 404. For non-sparse depth points, the system propagates depths of system-selected sparse depth points to non-sparse depth points within system-determined neighborhoods according to image-guided depth propagation.

At block 406 the system retrieves a depth point corresponding to a pixel of the color frame. The depth point is either a corresponding sparse depth point whose depth is retained as extracted from the source depth map or a non-sparse depth point to which the system propagates a depth.

At block 408, the system is capable of determining depths for generating a reconstructed depth map using image-guided depth propagation. For a sparse depth point, the depth is the depth retained from the source depth map. For a non-sparse depth point, the system propagates the depth of a system-selected sparse depth point within a neighborhood of the non-sparse depth point. In certain arrangements, the system determines the point depth, d(p), where p is the corresponding pixel, based on optimization of a predetermined function. For example, as described above, the system can determine depth d(p) by selecting the depth that minimizes a criterion function: $d(p) = \mathrm{argmin}_d(J(d))$, where J(d) is the predetermined criterion function. In some embodiments, criterion function is J(d) (above) includes two summations. The first summation $\Sigma_p \|d(p) - d_s(p)\|_2^2$ is a summation of Euclidean distances taken over neighborhood M of pixel p and ensures that, if the depth point is a sparse depth point, then depth d(p) remains unchanged. The second summation $\Sigma_{(p,q) \in N} W_{pq} \|d(p) - d(q)\|_2^2$ is a summation of Euclidean distances taken over pixels within the neighborhood (p,q)∈N of pixel p. Each of the summations can be balanced, respectively, by coefficients $\mu_s$ and $\mu_m$. The first summation is weighted by $W_s$, a binary parameter equal to one for sparse depth points and zero otherwise. The second summation is weighted by $W_{pq}$, the value of which is based on information also acquired from the received color frame.

At block 410, the depth d determined at block 408 is propagated to the depth point corresponding to pixel p for generating the reconstructed depth map.

At decision block 412, the system determines whether each depth point corresponding to each pixel has been processed for generating a reconstructed depth map. The reconstructed depth map comprises sparse depth points and non-sparse depth points. Through image-guided depth propagation, the sparse depth points retain the depths each had as a depth point of the source depth map from which each is extracted, and the non-sparse depth points each have a propagated depth. If the system determines at decision block 412 that not all depth points corresponding to a pixel of the color frame have been processed, the procedure returns to block 406. The system retrieves a depth point at block 406 and the image-guide depth propagation begins anew at block 408. If the system determines at decision block 412 that each depth has been processed, then the system outputs the reconstructed depth map at block 414.

At block 416, the system normalizes the coordinates of a color frame pixel using color frame information and the depth of a corresponding depth point of the reconstructed depth map obtained at block 414. The system can normalize the pixel's coordinates according to the size of the color frame and can add the depth of the corresponding depth point to generate the normalized coordinates vector ($x_n$, $y_n$, $z_n$).

At block 418, the system generates homogenous coordinates of the pixel. The system can generate a vector ($x_h$, $y_h$, $z_h$, w) whose elements are the homogeneous coordinates obtained from normalized coordinates ($x_n$, $y_n$, $z_n$, 1). At block 420, the system performs a space-warp transformation of the homogeneous coordinates ($x_h$, $y_h$, $z_h$, w) of the pixel based on the head poses. The system can reproject the pixel from 2D to 3D space. Performing matrix multiplication of the homogeneous coordinates ($x_h$, $y_h$, $z_h$, w) by a projection matrix, current head pose matrix, and predicted head pose matrix, the system generates reprojected coordinates ($x_f$, $y_f$, $z_f$, $w_f$) of the pixel of a space-warped image.

At decision block 422, the system determines whether each pixel of the color frame has been processed according to above-described procedure for generating reprojected coordinates of a space-warped image. If not, the system retrieves another unprocessed pixel. The procedure returns to block 416 and initiates processing the unprocessed pixel to generate reprojected coordinates according to the procedure at blocks 416 through 420. If at decision block 422, the system determines that all pixels are processed, then the procedure proceeds to block 424.

At block 424, the system transforms the image for displaying on the system's display device a space-warped rendering of the image. The space-warped rendering of the image corresponding to the viewpoint based on the user's predicted head pose.

Figure 5:
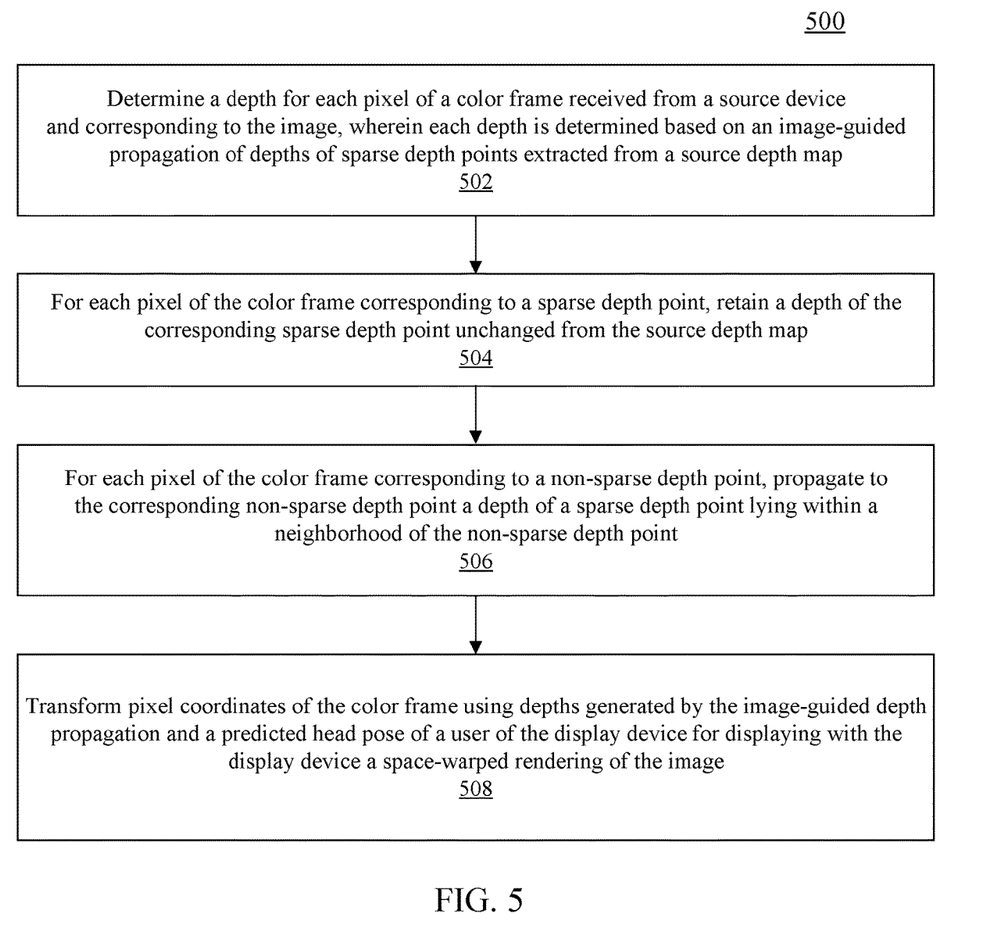
FIG. 5 illustrates an example method of space-warping an image using image-guided depth propagation.

FIG. 5 illustrates example method 500 of updating an image during a real-time rendering of images. Method 500 can be performed by display device 100 (e.g., HMD, AR glasses) that implements an image-guided depth propagation system for space-warping images. The device and image-guided depth propagation system for space-warping images are referred to, collectively, as "the system."

At block 502, the system is capable of determining a depth for each pixel of a color frame received from a source device and corresponding to the image. The system can determine each depth based on an image-guided propagation of depths of sparse depth points extracted from a source depth map.

At block 504, in performing the image-guided propagation with respect to each pixel of the color frame corresponding to a sparse depth point, the system can retain a depth of the corresponding sparse depth point unchanged from the source depth map. At block 506, in performing the image-guided propagation with respect to each pixel of the color frame corresponding to a non-sparse depth point, the system can propagate to the corresponding non-sparse depth point a depth of a sparse depth point lying within a neighborhood of the non-sparse depth point.

At block 508, the system can transform pixel coordinates of the color frame. The system can perform the transformation using depths generated by the image-guided depth propagation and a predicted head pose of a user of the display device. The system can use the transformation for displaying with the display device a space-warped rendering of the image.

In certain embodiments, in performing the image-guided depth propagation, the system propagates depths of sparse depth points based on edge and boundary information extracted from the color frame and features extracted from the source depth map. The features can include edges and object contours of the image. In accordance with some arrangements, each depth propagated within each neighborhood is selected by the system based on the optimization (e.g., minimization) of a predetermined criterion function whose domain comprises sparse and non-sparse depth points. The predetermined criterion function can include weighted summations of distances between pairs of sparse and non-sparse depth points and pairs of non-sparse depth points within each neighborhood. In accordance with some arrangements, each neighborhood is determined based on a density of sparse depth points within a predetermined distance from the non-sparse depth point.

In certain embodiments, the system transforms pixel coordinates of the color frame by integrating pixel coordinates of the color frame with depths generated by the image-guided depth propagation to create an RGB-D map. The system normalizes coordinates of the RGB-D map, and based on the normalized coordinates, generates homogeneous coordinates of the RGB-D map. The system generates the space-warped rendering of the image based on the homogenous coordinates of the RGB-D map and the predicted head pose of the user.

In some embodiments, the system performs the image-guided depth propagation pixel-by-pixel to provide a depth corresponding to each pixel as each pixel's coordinates are transformed. In other embodiments, the system performs the image-guided depth propagation by generating a reconstructed depth map prior to the transforming pixel coordinates. A reconstructed map generated by the system comprises sparse and non-sparse depth points that each uniquely correspond to a pixel of the color frame. In still other embodiments, the system performs the image-guided depth propagation with respect to a predetermined region of interest of the image.

FIG. 6 illustrates an example device 600 configured for operation as a system. Device 600 includes one or more processors 602 coupled to memory 604 through interface circuitry 606. Device 600 stores computer readable instructions (also referred to as "program code") within memory 604, which is an example of computer readable storage media. Processor(s) 606 execute the program code accessed from memory 604 via interface circuitry 606.

Memory 604 can include one or more physical memory devices such as local memory 608 and bulk storage device 610, for example. Local memory 608 is implemented as one or more non-persistent memory device(s) generally used during actual execution of the program code. Local memory 608 is an example of a runtime memory. Examples of local memory 608 include any of the various types of RAM suitable for use by a processor for executing program code. Bulk storage device 610 is implemented as a persistent data storage device. Examples of bulk storage device 610 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 600 can also include one or more cache memories (not shown) that provide temporary storage of at least some program code in order to reduce the number of times program code must be retrieved from a bulk storage device during execution.

Examples of interface circuitry 606 include, but are not limited to, an input/output (I/O) subsystem, an I/O interface, a bus system, and a memory interface. For example, interface circuitry 606 can be implemented as any of a variety of bus structures and/or combinations of bus structures including a memory bus or memory controller, a peripheral bus, an accelerated graphics port, and a processor or local bus.

In one or more example implementations, processor(s) 602, memory 604, and/or interface circuitry 606 are implemented as separate components. Processor(s) 602, memory 604, and/or interface circuitry 606 may be integrated in one or more integrated circuits. The various components in device 600, for example, can be coupled by one or more communication buses or signal lines (e.g., interconnects and/or wires). Memory 604 may be coupled to interface circuitry 606 via a memory interface, such as a memory controller or other memory interface (not shown).

Device 600 can include one or more displays. Illustratively, for example, device 600 includes display 612 (e.g., a screen). If device 600 is configured as an HMD, for example, display 612 can be a monocular MID comprising a single optic or a binocular HMD comprising an optic in front of each eye. As an HMD, display 612 can comprise lenses and semi-transparent mirrors embedded in eyeglasses (also termed data glasses), a visor, or a helmet. Display 612 can be implemented as a touch-sensitive or touchscreen display capable of receiving touch input from a user. A touch sensitive display and/or a touch-sensitive pad is capable of detecting contact, movement, gestures, and breaks in contact using any of a variety of avail, able touch sensitivity technologies. Example touch sensitive technologies include, but are not limited to, capacitive, resistive, infrared, and surface acoustic wave technologies, and other proximity sensor arrays or other elements for determining one or more points of contact with a touch sensitive display and/or device.

Device 600 can include camera subsystem 614. Camera subsystem 614 can be coupled to interface circuitry 606 directly or through a suitable input/output (I/O) controller. Camera subsystem 614 can be coupled to optical sensor 616. Optical sensor 616 can be implemented using any of a variety of technologies. Examples of optical sensor 616 can include, but are not limited to, a charged coupled device (CCD) or a complementary metal-oxide semiconductor (CMOS) optical sensor. Camera subsystem 614 and optical sensor 616 are capable of performing camera functions such as recording or capturing images and/or recording video.

Device 600 can include an audio subsystem 618. Audio subsystem 618 can be coupled to interface circuitry 606 directly or through a suitable input/output (I/O) controller. Audio subsystem 618 can be coupled to a speaker 620 and a microphone 622 to facilitate voice-enabled functions, such as voice recognition, voice replication, digital recording, and telephony functions.

Device 600 can include one or more wireless communication subsystems 624. Each of wireless communication subsystem(s) 624 can be coupled to interface circuitry 606 directly or through a suitable I/O controller (not shown). Each of wireless communication subsystem(s) 624 is capable of facilitating communication functions. Examples of wireless communication subsystems 624 can include, but are not limited to, radio frequency receivers and transmitters, and optical (e.g., infrared) receivers and transmitters. The specific design and implementation of wireless communication subsystem 624 can depend on the particular type of device 600 implemented and/or the communication network(s) over which device 600 is intended to operate.

As an illustrative and non-limiting example, wireless communication subsystem(s) 624 may be designed to operate over one or more mobile networks, WiFi networks, short range wireless networks (e.g., a Bluetooth), and/or any combination of the foregoing. Wireless communication subsystem(s) 624 can implement hosting protocols such that device 600 can be configured as a base station for other wireless devices.

Device 600 may include one or more sensors 626, each of which can be coupled to interface circuitry 606 directly or through a suitable I/O controller (not shown). Examples of sensor(s) 626 that can be included in device 600 include, but are not limited to, a motion sensor, a light sensor, and a proximity sensor to facilitate orientation, lighting, and proximity functions, respectively, of device 600. Other examples of sensors 626 can include, but are not limited to, a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 600 in 3D, and an altimeter (e.g., an integrated circuit) capable of providing data indicating altitude.

Device 600 further may include one or more input/output (I/O) devices 628 coupled to interface circuitry 606. I/O device(s) 628 can be coupled to interface circuitry 606 either directly or through intervening I/O controllers (not shown). Examples of I/O devices 628 include, but are not limited to, a track pad, a keyboard, a display device, a pointing device, one or more communication ports (e.g., Universal Serial Bus (USB) ports), a network adapter, and buttons or other physical controls. A network adapter refers to circuitry that enables device 600 to become coupled to other systems, computer systems, remote printers, and/or remote storage devices through intervening private or public networks. Modems, cable modems, Ethernet interfaces, and wireless transceivers not part of wireless communication subsystem(s) 624 are examples of different types of network adapters that may be used with device 600. One or more of I/O devices 628 may be adapted to control functions of one or more or all of sensors 626 and/or one or more of wireless communication sub system(s) 624.

Memory 604 stores program code. Examples of program code include, but are not limited to, routines, programs, objects, components, logic, and other data structures. For purposes of illustration, memory 604 stores an operating system 630 and application(s) 632. In addition memory 604 can store XR program code 634 and an image rendering engine 636, as described within this disclosure. Image rendering engine 636 can cooperatively process images generated using XR program code 632 and/or images captured by camera subsystem 614.

In an aspect, operating system 630 implemented in executable program code is executed by device 600 and, more particularly, by processor(s) 602, as are applications 632, XR program code 634. If device 600 is configured as a display device (e.g., HMD), other program code can include depth propagation code 636 for implementing image-guided depth propagation, as well as code for tracking with other components head positions of a user. If device 600 is configured as a source device, other program code can include, for example, code implementing an image rendering image. As such, operating system 630, application(s) 632, XR program code 634, and depth propagation code 636 may be considered an integrated part of device 600. Further, it should be appreciated that any data and/or program code used, generated, and/or operated upon by device 600 (e.g., processor(s) 602) are functional data structures that impart functionality when employed as part of device 600.

Device 600 is provided for purposes of illustration and not limitation. A device and/or system configured to perform the operations described herein can have a different architecture than illustrated in FIG. 6. The architecture can be a simplified version of the architecture described in connection with FIG. 6 that includes a memory capable of storing instructions and a processor capable of executing instructions. In this regard, device 600 may include fewer components than shown or additional components not illustrated in FIG. 6 depending upon the particular type of device that is implemented. In addition, the particular operating system and/or application(s) included can vary according to device type as can the types of I/O devices included. Further, one or more of the illustrative components can be incorporated into, or otherwise form a portion of, another component. For example, a processor may include at least some memory.

Device 600 can be implemented as a data processing system, a communication device, or other suitable system that is suitable for storing and/or executing program code. Device 600 can be implemented as an edge device. Example implementations of device 600 can include, but are not to limited to, an HMD, a pair of AR glasses, a smart phone or other mobile device or phone, or a wearable computing device. In other example implementations, operations comparable to those described with respect to device 600 also can be implemented in other computing devices. Other computing devices include, for example, a computer (e.g., desktop, laptop, tablet computer), a television, an entertainment console, an XR system, or other appliance capable of cooperatively operating as a display device (e.g., HMD, AR glasses) or a source device (e.g., smartphone, console, computer) operating in conjunction with a display device, as described herein.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "real-time" means a level of processing responsiveness that a user or system senses as sufficiently immediate for a particular process or determination to be made, or that enables the processor to keep up with some external process.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The term "user" refers to a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of updating an image during a real-time rendering of images, the method comprising:
   determining, with a display device, a depth for each pixel of a color frame received from a source device and corresponding to the image, wherein each depth is determined based on an image-guided propagation of depths of sparse depth points extracted from a source depth map, and wherein the image-guided depth propagation includes:
      for each pixel of the color frame corresponding to a sparse depth point, retaining a depth of the corresponding sparse depth point unchanged from the source depth map; and
      for each pixel of the color frame corresponding to a non-sparse depth point, propagating to the corresponding non-sparse depth point a depth of a sparse depth point lying within a neighborhood of the non-sparse depth point; and
   transforming pixel coordinates of the color frame using depths generated by the image-guided depth propagation and a predicted head pose of a user of the display device for displaying with the display device a space-warped rendering of the image.

2. The method of claim 1, wherein the image-guided depth propagation propagates depths of sparse depth points based on edge and boundary information extracted from the color frame and features extracted from the source depth map, the features including edges and object contours of the image.

3. The method of claim 1, wherein
   each depth propagated within each neighborhood is selected based on minimizing a predetermined criterion function whose domain comprises sparse and non-sparse depth points; and
   the predetermined criterion function includes weighted summations of distances between pairs of sparse and non-sparse depth points and pairs of non-sparse depth points within each neighborhood.

4. The method of claim 1, wherein each neighborhood is determined based on a density of sparse depth points within a predetermined distance from the non-sparse depth point.

5. The method of claim 1, wherein the transforming includes:
   integrating the pixel coordinates with depths generated by the image-guided depth propagation to create an RGB-D map;
   normalizing coordinates of the RGB-D map;
   generating homogeneous coordinates based on the normalized RGB-D coordinates; and
   generating the space-warped rendering of the image based on the homogenous coordinates and the predicted head pose of the user.

6. The method of claim 1, wherein the image-guided depth propagation is performed pixel-by-pixel to provide a depth corresponding to each pixel as each pixel's coordinates are transformed.

7. The method of claim 1, wherein the image-guided depth propagation generates a reconstructed depth map prior to the transforming pixel coordinates, the reconstructed map comprising sparse and non-sparse depth points that each uniquely correspond to a pixel of the color frame.

8. The method of claim 1, wherein the image-guided depth propagation is performed with respect to a predetermined region of interest of the image.

9. A system for updating an image during a real-time rendering of images, the system comprising:
a processor disposed in a display device, wherein the processor is configured to initiate operations including:
determining a depth for each pixel of a color frame received from a source device and corresponding to the image, wherein each depth is determined based on an image-guided propagation of depths of sparse depth points extracted from a source depth map, and wherein the image-guided depth propagation includes:
for each pixel of the color frame corresponding to a sparse depth point, retaining a depth of the corresponding sparse depth point unchanged from the source depth map; and
for each pixel of the color frame corresponding to a non-sparse depth point, propagating to the corresponding non-sparse depth point a depth of a sparse depth point lying within a neighborhood of the non-sparse depth point; and
transforming pixel coordinates of the color frame using depths generated by the image-guided depth propagation and a predicted head pose of a user of the display device for displaying with the display device a space-warped rendering of the image.

10. The system of claim 9, wherein the image-guided depth propagation propagates depths of sparse depth points based on edge and boundary information extracted from the color frame and features extracted from the source depth map, the features including edges and object contours of the image.

11. The system of claim 9, wherein
each depth propagated within each neighborhood is selected based on minimizing a predetermined criterion function whose domain comprises sparse and non-sparse depth points; and
the predetermined criterion function includes weighted summations of distances between pairs of sparse and non-sparse depth points and pairs of non-sparse depth points within each neighborhood.

12. The system of claim 9, wherein each neighborhood is determined based on a density of sparse depth points within a predetermined distance from the non-sparse depth point.

13. The system of claim 9, wherein the transforming includes:
integrating the pixel coordinates with depths generated by the image-guided depth propagation to create an RGB-D map;
normalizing coordinates of the RGB-D map;
generating homogeneous coordinates based on the normalized RGB-D coordinates; and
generating the space-warped rendering of the image based on the homogenous coordinates and the predicted head pose of the user.

14. The system of claim 9, wherein the image-guided depth propagation is performed pixel-by-pixel to provide a depth corresponding to each pixel as each pixel's coordinates are transformed.

15. The system of claim 9, wherein the image-guided depth propagation generates a reconstructed depth map prior to the transforming pixel coordinates, the reconstructed map comprising sparse and non-sparse depth points that each uniquely correspond to a pixel of the color frame.

16. The system of claim 9, wherein the image-guided depth propagation is performed with respect to a predetermined region of interest of the image.

17. A computer program product, comprising:
one or more computer readable storage media, and program instructions collectively stored on the one or more computer readable storage media, wherein the program instructions are executable by computer hardware of a display device to initiate operations including:
determining a depth for each pixel of a color frame received from a source device and corresponding to an image, wherein each depth is determined based on an image-guided propagation of depths of sparse depth points extracted from a source depth map, and wherein the image-guided depth propagation includes:
for each pixel of the color frame corresponding to a sparse depth point, retaining a depth of the corresponding sparse depth point unchanged from the source depth map; and
for each pixel of the color frame corresponding to a non-sparse depth point, propagating to the corresponding non-sparse depth point a depth of a sparse depth point lying within a neighborhood of the non-sparse depth point; and
transforming pixel coordinates of the color frame using depths generated by the image-guided depth propagation and a predicted head pose of a user of the display device for displaying with the display device a space-warped rendering of the image.

18. The computer program product of claim 17, wherein the image-guided depth propagation propagates depths of sparse depth points based on edge and boundary information extracted from the color frame and features extracted from the source depth map, the features including edges and object contours of the image.

19. The computer program product of claim 17, wherein
each depth propagated within each neighborhood is selected based on minimizing a predetermined criterion function whose domain comprises sparse and non-sparse depth points; and
the predetermined criterion function includes weighted summations of distances between pairs of sparse and non-sparse depth points and pairs of non-sparse depth points within each neighborhood.

20. The computer program product of claim 17, wherein each neighborhood is determined based on a density of sparse depth points within a predetermined distance from the non-sparse depth point.

* * * * *